Feb. 4, 1936.　　　O. W. GITHENS　　　2,029,475
PHOTOGRAPHIC CAMERA
Filed Aug. 4, 1933　　　2 Sheets-Sheet 1
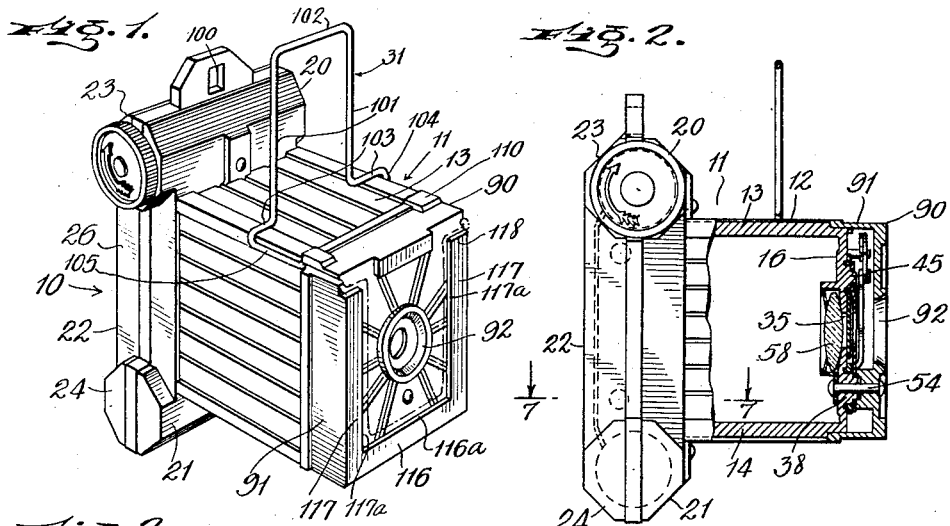
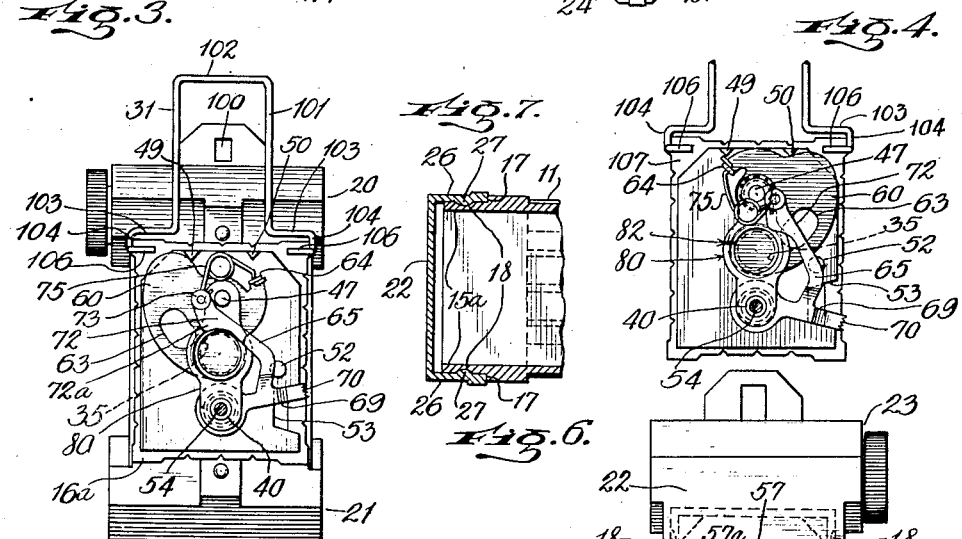
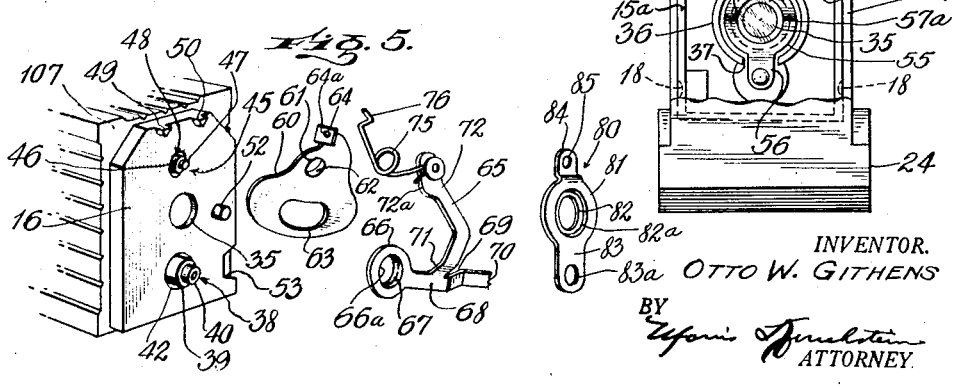
INVENTOR.
OTTO W. GITHENS
BY
ATTORNEY.

Feb. 4, 1936.  O. W. GITHENS  2,029,475
PHOTOGRAPHIC CAMERA
Filed Aug. 4, 1933   2 Sheets-Sheet 2
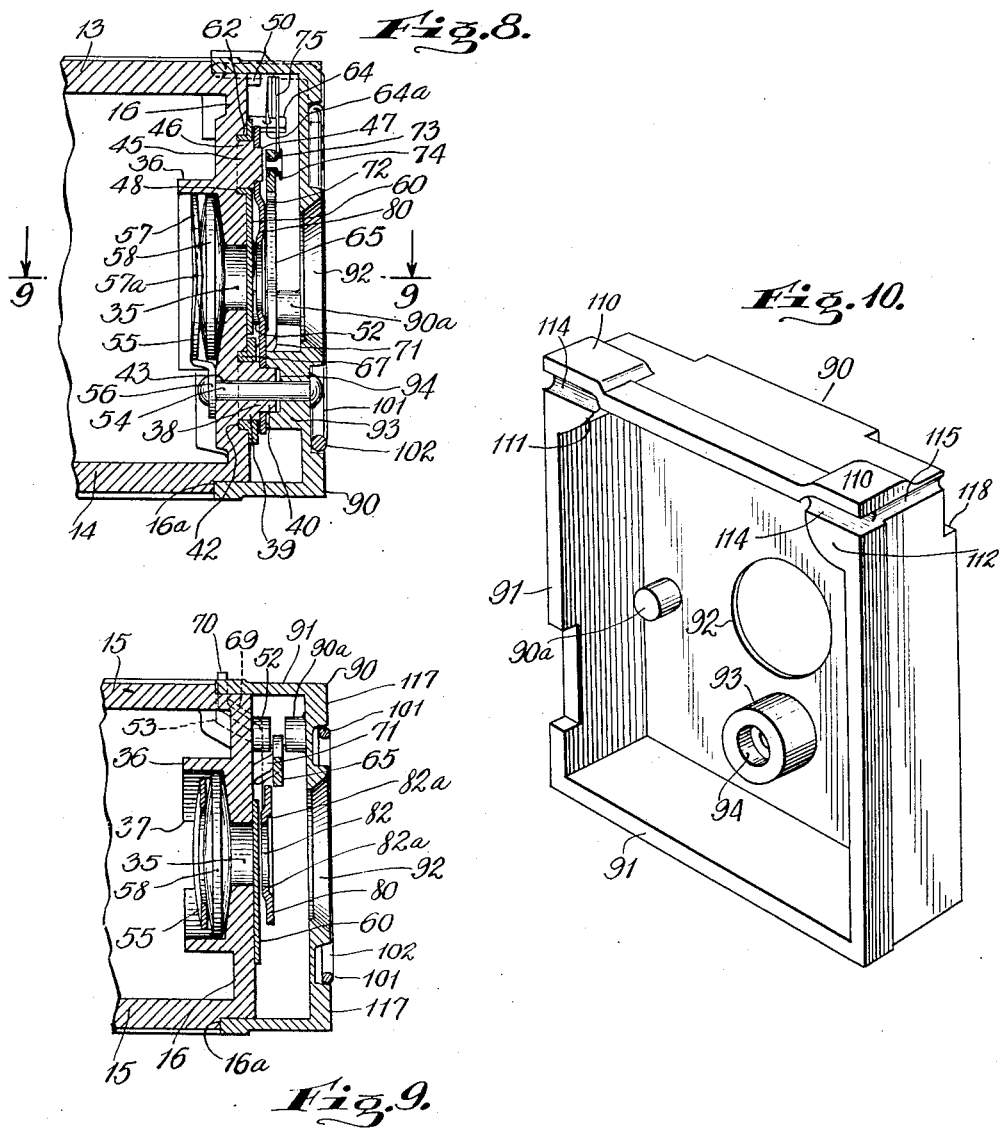
INVENTOR.
OTTO W. GITHENS
BY
ATTORNEY Patented Feb. 4, 1936

2,029,475

UNITED STATES PATENT OFFICE 2,029,475

PHOTOGRAPHIC CAMERA

Otto W. Githens, New York, N. Y., assignor to Universal Camera Corporation, New York, N. Y., a corporation of New York Application August 4, 1933, Serial No. 683,595

33 Claims. (Cl. 95—59)

This invention relates to photographic cameras.

An object of this invention is to provide a camera having highly improved shutter mechanism, the construction including a pivoted shutter plate and a single member supporting the plate for movement in a single plane and for preventing passage of light except through the lens opening when the shutter plate uncovers the same.

A further object of this invention is to provide in a camera of the character described, improved means for mounting the shutter plate and actuating lever.

A still further object of this invention is to provide a camera of the character described so constructed that the lens, the shutter mechanism and the front plate of the camera covering the shutter mechanism may be assembled to the camera casing by a single fastening member.

A still further object of this invention is to provide a neat, compact and rugged camera of the character described, which shall be comparatively inexpensive to manufacture, comprise few and simple parts, easy to assemble and manipulate and which shall nevertheless, be practical and efficient to a high degree in use.

Certain features, shown, described and claimed in this application, are shown and described, but not claimed in my co-pending application Serial No. 659,912, filed March 7th, 1933, of which application the present application is a continuation in part.

The invention accordingly consists in the features of construction, combinations of elements, and arrangement of parts which will be exemplified in the construction hereinafter described, and of which the scope of this application will be indicated in the following claims.

In the accompanying drawings, in which is shown one of the various possible illustrative embodiments of this invention, Fig. 1 is a perspective view of a camera embodying the invention;

Fig. 2 is a side elevational view of the camera shown in Fig. 1 with parts in cross-section;

Fig. 3 is a front elevational view of my improved camera with the front cover plate removed and showing the shutter mechanism in one position;

Fig. 4 is a front partial elevational view of the camera with the front cover plate removed and showing the shutter mechanism in another position;

Fig. 5 is a perspective view of the front of the camera and showing parts of the shutter mechanism disassembled; and Fig. 6 is a rear elevational view of the camera with parts broken away to show the interior construction;

Fig. 7 is a cross-sectional view taken on line 7—7 of Fig. 2;

Fig. 8 is an enlarged view of the front end of the camera in cross-section;

Fig. 9 is a cross-sectional view taken on line 9—9 of Fig. 8; and

Fig. 10 is a perspective inner view of the cover.

Referring now in detail to the drawings, 10 designates a camera embodying the invention and comprises a casing 11 made of any suitable molding composition. The casing comprises a prismatic front portion 12 having top and bottom walls 13 and 14, side walls 15 and a front wall 16. The rear ends of said side walls 15 are reduced in thickness to form walls 15a and external shoulders 17.

The outer surface of each of the thinned walls 15a is formed with a pair of spaced indentations or sockets 18. Extending from the top and bottom walls 13 and 14 of the casing, and adjacent the rear end of the prismatic portion 12 of the casing, are substantially semi-cylindrical portions 20 and 21. For closing the rear of the camera casing, there is provided a member 22 having portions 23 and 24 at the upper and lower ends thereof cooperating with the portions 20 and 21 to form chambers for the film reels. The member 22 is further formed with side walls 26 receiving the thinned walls 15a and having projections 27 adapted to snap into the sockets 18 for holding the member 22 in closing position. Received within the back of the casing and within the member 22 are film spools shown, described and claimed in my said co-pending application.

The front wall 16 of the casing is formed with a central lens opening or aperture 35 and with an inwardly projecting split cylindrical portion 36 concentric with said opening 35, and formed with a cut-away portion 37 at the bottom. Said front wall 16 is furthermore formed with a cylindrical boss or pin 38 projecting outwardly and disposed in alignment with and below the opening 35. The pin or boss 38 is provided with a base 39 of wider diameter and a reduced pin portion 40 extending from the base portion 39. A groove 42 surrounding the base 39 is formed in the outer surface of the front wall 16. The boss 38 is formed with an axial through opening 43 for the purpose hereinafter appearing.

Said front wall 16 is further formed above the opening 35 and aligned therewith and with the lower boss 38, with a cylindrical boss or pin 45 likewise having a base portion 46 of greater diameter and a projection or pin portion 47 of reduced diameter. A groove 48 in wall 16 surrounds the base portion 46. Said outer wall 16 may further be formed with a pair of symmetrically disposed spaced stops 49 and 50 adjacent the top end thereof.

The outer surface of said front wall 16 is further formed with a pin or projection 52 disposed on one side of the opening 35. The bosses 38 and 45 and the stops 49 and 50 and the pin 52 as well as the cylindrical projection 36 are all molded integrally with the front wall of the casing.

It will be noted that the base portion 39 of the boss 38 is of greater diameter than the base portion 46 of the boss 45 and that the diameter of the projection 40 on said base 39 is of greater diameter than the projection 47 of said base 46. Furthermore, the base 39 projects further than base 46, and the pin 40 projects further than pin 47.

One side of the front wall 16 is formed with a recess 53 at the outer surface thereof, for the purpose hereinafter appearing.

Attached to the inner side of the front wall 16 by means of rivet 54 passing through the opening 43 is a spring washer 55 having an arm 56 passing through the cut-away portion 27 of the cylindrical portion 36 and formed with an aperture receiving said rivet therethrough. The member 55 is further formed with a circular portion 57 having an opening registering with the opening 35 in the front wall. A lens member 58 received between the circular portion 57 and the inner side of the front wall is supported by said washer and disposed between the opening 35 and the opening in said circular portion.

The circular portion 57 of the spring washer 55 is preferably bent into diverging planes meeting on a horizontal axis forming a pair of horizontally aligned edges 57a adapted to contact the lens on diametrically opposite sides thereof adjacent the edges thereof, whereby the lens will be retained in substantially vertical position. With this construction contact of the spring at diametrically disposed points on the lens is assured, and tilting of the lens usually caused by pressure at one end only of the lens is obviated.

The shutter mechanism comprises a shutter member 60 preferably made of sheet metal and having an opening or aperture 61 receiving the base portion 46 of the boss 45, said shutter member being formed with a flange 62 at said opening received within the groove 48. The shutter member 60 lies flat against the outer surface of the front wall and is formed with a shutter opening 63 having a width equal to the diameter of the opening 35, but being somewhat elongated. Said member 60 is pivoted on the boss 45 and is adapted to uncover the opening 35 as the same is oscillated. Extending from the upper end of the shutter 60 at right angles thereto, is a lug 64 formed with a small opening.

Mounted on the boss 38 is a lever 65 likewise preferably made of stamped sheet metal and having a ring portion 66 formed with an opening 66a receiving the base 39 of said boss. Said lever is preferably formed with a flange 67 at said opening extending into the groove 42. The circular portion 66 lies flat against the outer face of the front wall 16 and extending therefrom is an arm 68 from which there is bent inwardly a strip 69 projecting into the recess 53 of the casing. Extending from the inclined portion 69 is a handle extension 70 parallel to the portion 68 and projecting somewhat beyond the side of the casing, so that the same may be engaged by a finger for operating the lever. There also extends from the arm 68 an upwardly extending portion 71 inclined away from the outer face of the front wall 16, and extending from said inclined portion is a portion 72 disposed at a plane parallel to and spaced from the outer face of said front wall. The portion 72 is angular and the upper end thereof terminates adjacent to and on one side of the boss 45 in a widened portion 72a. Fixed to the outer end of said portion 72 is an eyelet 73 having a flat circular head 74 parallel to and spaced from said portion 72a, forming a thin circular groove therewith.

Attached to the rivet 73 and disposed between the head of said eyelet and said portion 72 is one end of an actuating spring link 75. The spring 75 may have a coiled intermediate portion and the other end thereof is preferably hooked and engages within the opening 64a of the lug 64. The eyelet flange or head 74 serves to retain the spring in a single plane during operation of the camera.

There is further mounted on the bosses 38 and 45 a combination bridging spring and light baffle 80. Said member 80 lies substantially parallel to the shutter member 60 and is formed with a central circular portion 81 having an opening 82 substantially similar in size to the opening 35 and registering therewith. Extending downwardly from the portion 81 is an ear 83 having a central opening 83a receiving the projecting portion 40 of the boss 38, and contacting the shoulder formed by the base 39 of said boss. Extending upwardly from said portion 81 is an ear 84 bent inwardly and formed with an opening 85 receiving the projecting portion 47 of the boss 45 and contacting the shoulder formed by the base 46 of said boss. The upper end portion 72a of the operating lever 65 overlies the upper end of the member 80 in all positions during movement of said lever. The lower and upper ends of baffle 80 do not press against the lens and shutter, a slight clearance being allowed whereby free rotation of said lever and shutter is permitted, said members nevertheless being retained in their operating planes by said bridge.

The edge of the bridge 80 at the opening 82 is depressed, at 82a somewhat toward the shutter without pressing against the same, to aid in retaining said shutter in its plane of movement, flat against the front wall of the casing. Thus should the shutter tilt, the same will contact the depressed portion 83a for limiting tilting movement of the shutter and for retaining the shutter out of contact with the bottom or heel of the inwardly bent upper ear 84.

Attached to said front wall by means of said rivet 54 is a front cover member 90 likewise preferably made of molding material and having a flange 91 at the top, bottom and sides, received within a groove 16a formed around the top, bottom and sides of the front wall. The cover 90 is formed with a central opening 92 and with an inwardly projecting integral boss or ferrule 93 formed with a central opening 94 receiving the outer end of the pin portion 40 of said boss 38. The boss 93 is formed with a central through opening receiving therethrough the rivet 54 which firmly attaches the cover to the front of the casing. The boss 93 contacts the bottom end of the member 80 and clamps the same to base 37 and holds said member firmly for pressing the upper end thereof against the base 46 to retain the shutter substantially flat against the outer surface of said front wall. The single rivet thus serves to hold in assembled relation with respect to the camera casing, the front cover member 90, the operating lever 65, the bridge 80, the shutter member 60, the spring washer 55 and the lens 58. The cover may be provided with a pin 90a aligned with pin 52 and cooperating therewith to retain the operating lever in its plane of movement.

The operation of the device will now be understood. Beginning with the parts shown in Fig. 3, the lever handle 70 is up and the shutter opening 63 is on the left. The upper edge of the shutter plate furthermore, contacts the left stop member 49 and the upper end of the portion 72 of the operating lever is disposed to the left of the boss 45. Upon pressing the lever handle downwardly, the spring 75 will cause the shutter member 60 to oscillate until an opposite edge of said shutter member contacts the other stop 50. During this movement, the opening 63 uncovers the registering openings 35 and 82 to permit light to pass into the camera to expose the film. The next exposure is made by moving the handle upwardly from the position shown in Fig. 4 to the position shown in Fig. 3. The portion 72 of the lever preferably contacts the pin 52 which aids in retaining said portion of the lever in its plane of movement during the operation thereof. The widened upper end of the lever overlies the bridge spring 80 in all positions of said lever, thus preventing catching of the operating parts.

The member 80 serves as a light baffle to prevent leakage of light through the opening 35 and further serves as a spring clip for holding the shutter member 60 against the outer face of the front wall of the casing, clearance only being provided to prevent binding of the shutter.

The back member 22 of the casing is formed at the top end thereof with a central vertical wall 30 having a rectangular sight opening 100 cooperating with a wire finder 31 swivelled in the manner hereinafter appearing, to the camera casing. The finder 31 may be made of a single piece of suitably bent and shaped wire and comprises a pair of vertical, parallel portions 101 interconnected at the top by a horizontal portion 102. Extending outwardly from the lower ends of the vertical portions 101 are horizontal, aligned portions 103 contacting the top surface of the casing. Extending downwardly from the outer ends of said aligned portions 103 are parallel portions 104 contacting the side surfaces of the casing. The portions 104 are preferably short, and extending forwardly from the lower ends thereof are parallel portions 105 contacting the sides of the casing adjacent the top surface. Extending inwardly from the forward ends of the portions 105 are aligned axle portions 106 contacting the front surface 107 of the front wall of the casing. For the purpose hereinafter appearing, the top flange of the member 90 is formed at the ends thereof and adjacent the edge thereof with raised portions 110. The corners formed by the top flange and the side flanges of the cover are thickened as at 111, having an outer surface 112. The outer surface 112 of the thickened corners 111 are formed with aligned, horizontal grooves 114 adapted to rotatably receive the axle portions 106 of the finder. The side flanges of the cover are formed with horizontal grooves 115 communicating with the grooves 114, for the purpose hereinafter appearing. The front surface of the member 90 is formed with a raised shoulder 116 at the bottom and with raised shoulders 117 at the sides, terminating as at 118, short of the top of the cover. The front surface of the cover is thus recessed and provides a bottom ledge 116a, side ledges 117a and the top ledges 118 at the upper ends of the raised portions 117.

When the cover is attached to the casing the finder 31 is swivelled to the casing and may be moved from the full line position of use shown in Fig. 1 to the dot dash line position of Fig. 1. When the finder is in use, the portions 104 and 105 of the finder press against the sides of the camera casing for retaining the finder in upright position. However, when the camera is not in use, the finder may be swivelled to the dot dash line position and the portions 105 will snap into the grooves 115. The portions 103 will then lie adjacent the shoulders 118. The portions 101 of the finder will lie adjacent the shoulder 117a and the portion 102 will lie against the ledge or shoulder 116a. The front surface of the cover is thus recessed for receiving the portions of the finder which are then flush with the raised portions 116 and 117.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings, is to be interpreted as illustrative and not in a limiting sense.

Having thus described my invention, I claim as new and desire to secure by Letters Patent:—

1. In a camera, a casing having an apertured front wall, a shutter cooperating with the aperture, an operating lever for said shutter, and a single rivet for holding in assembled position the operating lever, shutter and casing.

2. In a camera, a casing having an apertured front wall, a shutter cooperating with the aperture, an operating lever for said shutter, a shutter cover, and a single rivet for holding in assembled position the shutter cover, operating lever, shutter and casing.

3. In a camera, a casing having an apertured front wall, a lens in said casing, a shutter having an aperture cooperating with the aperture in the front wall, a pin projecting from said front wall above said aperture and serving as a fulcrum for said shutter, an operating lever, a mounting pin for said lever on the front wall, a spring connecting the operating lever with said shutter, a spring having two apertures through which the two mounting pins pass, means including a shutter cover for placing under tension said last mentioned spring, and a single rivet for holding in assembled position the shutter cover, last mentioned spring, operating lever, shutter, casing and lens.

4. In a camera, a casing having an apertured front wall, a lens in said casing, a washer holding said lens in alignment with the aperture, a shutter having an aperture near one end cooperating with the aperture in the front wall, a pin projecting from said front wall above said aperture and serving as a fulcrum for said shutter, an operating lever, a mounting pin for said lever on the front wall below the aperture in said front wall, a spring connecting the free end of the operating lever with the other end of said shutter, a bridge spring having two apertures through which the two mounting pins pass and an aperture in alignment with the said aperture in said front wall, means including a shutter cover for placing under tension said bridge spring, and a single rivet for holding in assembled position the shutter cover, bridge spring, operating lever, shutter, casing and washer.

5. In a camera, a shutter having an aperture, means for pivoting said shutter adjacent to the aperture of the camera, an operating lever, means for pivoting said operating lever adjacent to the aperture of the camera, a spring link between said lever and said shutter, and a spring bridging the pivot points of said shutter and lever.

6. In a camera, a casing having an aperture, a shutter pivoted to said casing and having an aperture adapted to uncover the aperture in said casing, an operating lever, means for pivoting said operating lever to said casing adjacent to the aperture of said casing, a spring link between said lever and said shutter, and a member bridging the pivot points of said shutter and lever.

7. In a camera, a shutter having an aperture near one end, means for pivoting said shutter near its center adjacent to the aperture of the camera, an operating lever, means for pivoting said operating lever adjacent to the aperture of the camera, a spring link between the free end of said lever and the other end of said shutter, and a spring bridging the pivot points of said shutter and lever.

8. In a camera, a casing having an aperture, a shutter pivoted to said casing on one side of said aperture and having an aperture near one end adapted to uncover said first aperture, an operating lever, means for pivoting said operating lever to said casing on the other side of said first aperture, a spring link between the free end of said lever and said shutter and a spring bridging the pivot points of said shutter and lever, and means for clamping one end of said last spring at the pivot point for said lever, the opposite end of said last spring being adapted to retain said shutter in its plane of movement.

9. In a camera, a shutter having an aperture near one end, means for pivoting said shutter near its center adjacent to the aperture of the camera, an operating lever, means for pivoting said operating lever adjacent to the aperture of the camera, a spring link between the free end of said lever and the other end of said shutter, a spring bridging the pivot points of said shutter and lever, said last spring having an aperture in alignment with the aperture of the camera, and means including a shutter cover for placing said last mentioned spring under tension.

10. In a camera, a casing having an aperture, a shutter pivoted to said casing and having an aperture adapted to uncover the aperture in said casing, an operating lever for said shutter pivoted to said casing, and a flat spring apertured in alignment with the camera aperture attached to said casing and retaining said shutter and operating lever in their planes of movement, and baffling the passage of light to the camera aperture.

11. In a camera, a casing having a front wall formed with an opening, said casing being formed with a pair of integral outwardly extending projections disposed on opposite sides of said opening, a shutter member pivoted to one of said projections mediately the ends thereof and having an opening at one end adapted to uncover the opening in said front wall, a lever pivoted to the other projection and having an arm terminating adjacent said first projection, and a spring interconnecting the free end of said arm to the opposite end of said shutter.

12. In a camera, a casing having a front wall formed with an opening, said casing being formed with a pair of integral outwardly extending projections disposed on opposite sides of said opening, a shutter member pivoted to one of said projections mediately the ends thereof and having an opening at one end adapted to uncover the opening in said front wall, a lever pivoted to the other projection and having an arm terminating adjacent said first projection, and a spring interconnecting the free end of said arm to the opposite end of said shutter, the front wall of said casing being formed with circular grooves surrounding said projections and said shutter and lever being formed with flanges rotatably received within said grooves.

13. In a camera, a casing having a front wall formed with an opening and with a pair of projections on the opposite sides of said opening, a shutter pivoted to one of said projections, an operating lever for said shutter pivoted to the other of said projections and having a portion parallel to and spaced from said front wall and said front wall being formed with a projection adapted to contact said portion of said lever for retaining the same in its plane of movement.

14. In a camera, a casing, having a front wall formed with an aperture and with a pair of bosses on opposite sides of said aperture, each of said bosses having a base portion of larger diameter and a portion of smaller diameter projecting from said base portion, a shutter pivoted to the base portion of one of said bosses, an operating lever pivoted to the base portion of the other of said bosses, a spring interconnecting said lever and shutter, and a second spring having an opening receiving the portion projecting from the base of one of said bosses and an opening for receiving the portion projecting from the base of the other of said bosses, and means for clamping said second spring to said other of said bosses.

15. In a camera, a casing having a front wall formed with an aperture and with a pair of bosses on opposite sides of said aperture, each of said bosses having a base portion of large diameter and a portion of smaller diameter projecting from said base portion, a shutter pivoted to the base portion of one of said bosses, an operating lever pivoted to the base portion of the other of said bosses, a spring interconnecting said lever and shutter, a second spring having an opening receiving the portion projecting from the base of one of said bosses and an opening for receiving the portion projecting from the base of the other of said bosses, the other of said bosses being formed with a through opening, a cover for the shutter mechanism received over the front of said casing, said cover being formed with a ferrule provided with an opening receiving the portion projecting from the base of said other of said bosses and contacting said second spring, said ferrule being formed with a through opening aligned with said first mentioned through opening, and a rivet extending through said aligned openings for attaching said cover to the front wall of said casing.

16. In a camera, a casing having a front wall formed with an aperture, a shutter pivoted to said front wall and having an opening adapted to uncover said aperture, an operating lever pivoted to said front wall and having an arm, an eyelet attached to the end of said arm, said eyelet having a head parallel to said arm and forming a flat groove therewith, and a spring link having one end received within said groove and engaging said eyelet and the opposite end thereof attached to said shutter.

17. In a camera, a casing having a front wall formed with an aperture and a pair of projections on opposite sides of said aperture, a flat shutter pivoted to one of said projections and lying flat against the front surface of said front wall and having an opening adapted to uncover said aperture, an operating lever pivoted to the other of said projections, a spring link interconnecting an end of said lever with an end of said shutter, and a bridge having openings receiving said projections, and a central opening registering with said aperture, means for fixing one end of said bridge to said second projection and the edge of said bridge at said central opening being depressed toward said shutter, and the ear receiving said first projection likewise being depressed toward said shutter, there being a clearance between the depressed portions of said bridge and said shutter.

18. In a camera, a casing having a front wall, a front cover attached to said front wall and forming a chamber therewith, said front wall having a lens opening, a shutter within said chamber pivoted to said front wall, a rivet attaching said front cover to said front wall, and a lever pivoted about the axis of said rivet and connected to said shutter by a spring.

19. In a camera, a casing having a front wall, a front cover attached to said front wall and forming a chamber therewith, said front wall having a lens opening, a shutter within said chamber pivoted to said front wall, a rivet attaching said front cover to said front wall, a lever pivoted about the axis of said rivet and connected to said shutter by a spring, an actuating handle extending from said lever, and said front cover having a cut away portion for receiving said handle.

20. A camera comprising a casing having a front wall formed with shoulders at the edges thereof, a front cover for said casing having a front wall and top, bottom and side walls, the edges of said top, bottom and side walls engaging the shoulders formed on the front wall of said casing, and forming a chamber with said front wall, the front wall of said casing being formed with a lens opening, a shutter within said chamber pivoted to said front wall of said casing and cooperating with said lens opening, a rivet fastening said front cover to the front wall of said casing, and a lever pivoted about the axis of said rivet at one end and interconnected at the other end thereof to said shutter by a spring.

21. In a camera, a casing having a prismatic portion formed with a front wall, said front wall being provided with shoulders at the top, bottom and side edges thereof, a front cover comprising a front wall and top, bottom and side walls engaging said shoulders, the front wall of said prismatic portion being formed with a lens opening and with a through opening, the front wall of said cover being formed with a boss having an opening registering with said through opening, a rivet extending through said openings for attaching said cover to the front wall of said prismatic portion, a shutter received between said cover and the front wall of said prismatic portion, and a lever for operating said shutter connected thereto by means of a spring and pivoted about the axis of said rivet.

22. In a camera, a casing having a prismatic portion formed with a front wall, said front wall being provided with shoulders at the top, bottom and side edges thereof, a front cover comprising a front wall and top, bottom and side walls engaging said shoulders, the front wall of said prismatic portion being formed with a lens opening and with a through opening, the front wall of said cover being formed with a boss having an opening registering with said through opening, a rivet extending through said openings for attaching said cover to the front wall of said prismatic portion, a shutter received between said cover and the front wall of said prismatic portion, a lever for operating said shutter connected thereto by means of a spring and pivoted about the axis of said rivet, a member attached to the inner surface of the front wall of said prismatic portion by said rivet, and a lens supported between said member and said front wall of said prismatic portion and covering said lens opening.

23. In a camera shutter, the combination with a shutter casing, of shutter mechanism adapted to be mounted in the shutter casing, cooperating elements on the shutter mechanism and shutter casing for locating the former with respect to the latter, and means carried by the shutter cover for operatively engaging a part of the shutter mechanism to hold the cooperating elements of the shutter mechanism and shutter casing in operative relation.

24. A camera comprising a wall having an exposure aperture therein, a shutter blade pivotally mounted on said wall to swing over said aperture to open and close it, a bridge member overlying said blade for holding said blade in place substantially against said wall, a second wall on the opposite side of said bridge member from said first wall, and a part on said second wall contacting with said bridge member to hold it in place.

25. A camera comprising a wall having an exposure aperture therein, two pivots projecting from one side of said wall on opposite sides of said aperture, a shutter blade movably mounted on one of said pivots to swing across said aperture to open and close it, a shutter operating lever pivotally mounted on the other of said pivots, a bridge member extending from one of said pivots to the other and overlying both said blade and said lever to hold both of them in place, said bridge member having an aperture in alignment with said exposure aperture in said wall, a second wall substantially parallel to and spaced from said first wall and lying on the opposite side of said bridge member from said first wall, and fastening means extending from said second wall through one of said pivots to said first wall, to hold said walls in predetermined relationship to each other.

26. A camera comprising a hollow body forming a dark chamber and including a wall substantially closing the front end of said body, said wall having a recess therein at one edge thereof, a front plate mounted ahead of and spaced from said wall, a flange extending rearwardly from said front plate to a point to the rear of the plane of the front surface of said wall, a shutter blade mounted for movement between said wall and said plate, and a shutter operating lever having a portion lying between said wall and said plate in front of said plane of the front surface of said wall and another portion offset rearwardly therefrom and passing through said recess and behind said flange to an accessible external point.

27. In a camera shutter, the combination with a shutter casing, of shutter mechanism adapted to be mounted in the shutter casing, cooperating elements on the shutter mechanism and shutter casing for locating the former with respect to the latter, and comprising an aperture in one part and a pin carried by the other, parts of said shutter cover and shutter mechanism being adapted to contact and hold the shutter mechanism in the shutter casing, and means for attaching the shutter cover to the casing.

28. In a camera shutter, the combination with a shutter casing, means for locating shutter mechanism in said casing comprising one cooperating member, shutter mechanism including a second cooperating member adapted to cooperate with the first mentioned cooperating member for locating the shutter mechanism in a definite position in the casing, a cover for said shutter casing, means for attaching the cover to the shutter casing, said shutter cover being adapted to contact with and to be the sole means for holding the shutter mechanism in the casing with the cooperating parts of the shutter casing and shutter mechanism in contact.

29. A camera construction comprising a wall and a cover spaced from said wall, shutter mechanism including a plate, cooperating elements on said wall and plate for locating the plate in predetermined position with respect to the wall, and means carried by said cover for engaging said plate to hold said plate in predetermined position.

30. A camera comprising a wall having an exposure aperture therein, two pivots projecting from one side of said wall on opposite sides of said aperture, a shutter blade movably mounted on one of said pivots to swing across said aperture to open and close it, a shutter operating lever pivotally mounted on the other of said pivots, and a bridge member encircling both of said pivots and overlying both said blade and said lever to hold both of them in place.

31. A camera comprising a wall having an exposure aperture therein, two pivots projecting from one side of said wall on opposite sides of said aperture, a shutter blade movably mounted on one of said pivots to swing across said aperture to open and close it, a shutter operating lever pivotally mounted on the other of said pivots, and a bridge member having an aperture intermediate its ends alined with said exposure aperture in said wall and having its ends encircling said pivots and overlying said blade and lever respectively to hold them in place.

32. A camera comprising a wall having an exposure aperture therein, two pivots projecting from one side of said wall on opposite sides of said aperture, a shutter blade movably mounted on one of said pivots to swing across said aperture to open and close it, a shutter operating lever pivotally mounted on the other of said pivots, a bridge member extending from one of said pivots to the other end overlying both said blade and said lever to hold both of them in place, said bridge member having an aperture in alinement with said exposure aperture in said wall, a second wall substantially parallel to and spaced from said first wall and lying on the opposite side of said bridge member from said first wall, a lens on the side of said first wall opposite from said shutter blade and in optical alinement with said exposure aperture, holding means for holding said lens in position against said first wall, and fastening means extending from said second wall through said first wall to said holding means, to hold said walls in predetermined relationship to each other and to hold said lens in predetermined relationship to said walls.

33. A camera comprising two walls spaced from each other and having alined exposure apertures therein, a shutter blade pivotally mounted between said walls for swinging movement to open and close one of said apertures, a pivot between said walls and spaced from the pivotal axis of said shutter blade, a shutter operating lever encircling said pivot and turnable thereon, said lever having a portion extending from said pivot to an accessible external point and another portion extending at an angle to said first named portion from a point intermediate the ends of said first named portion, and spring means connecting said other portion of said lever to said blade.

OTTO W. GITHENS.